Sept. 19, 1939.  J. C. WILLIAMS  2,173,192
PERISCOPE
Filed Nov. 10, 1937  2 Sheets-Sheet 1
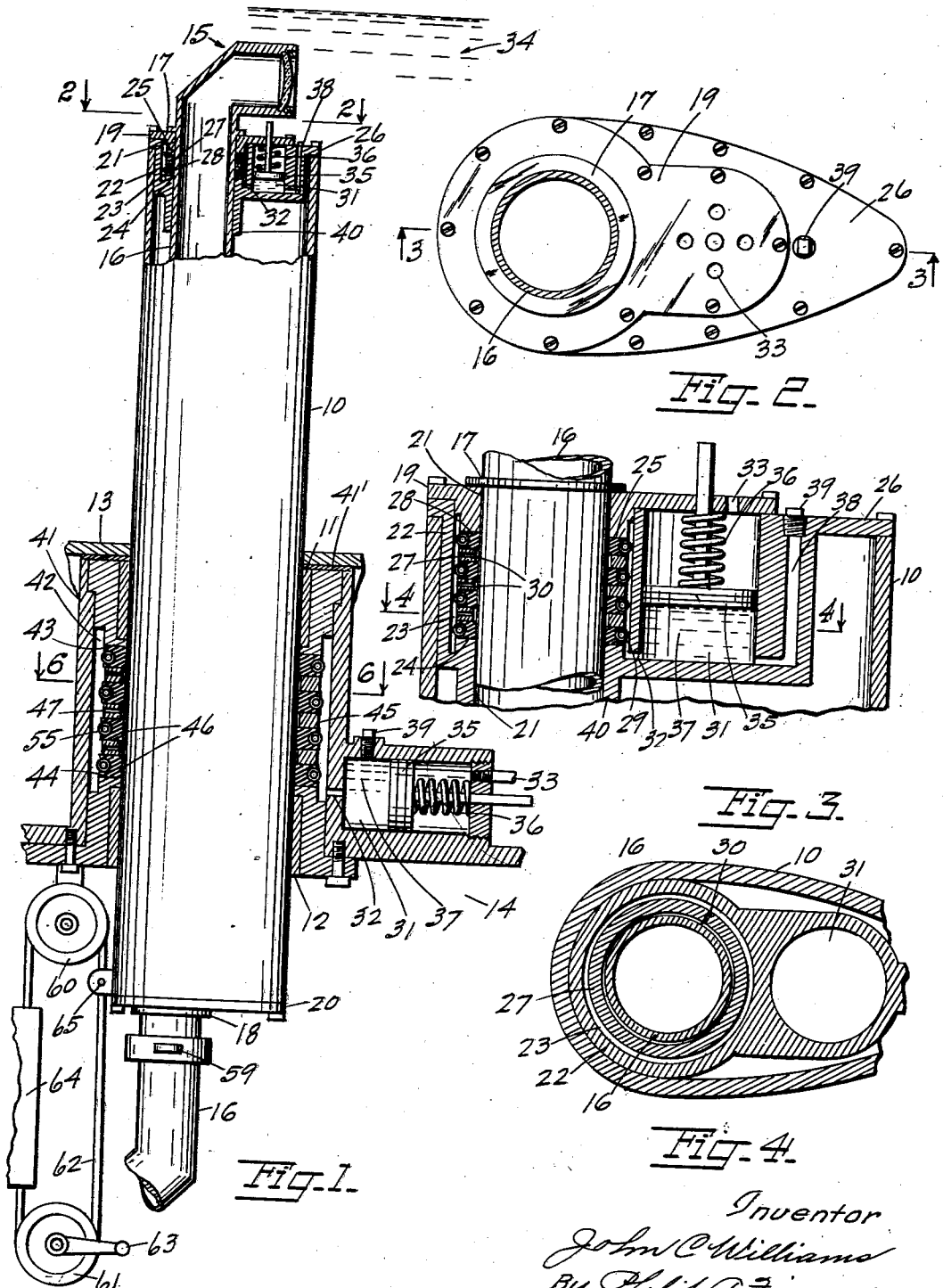
Inventor
John C Williams
By Philip A Friedell
Attorney Sept. 19, 1939.   J. C. WILLIAMS   2,173,192
PERISCOPE
Filed Nov. 10, 1937   2 Sheets-Sheet 2
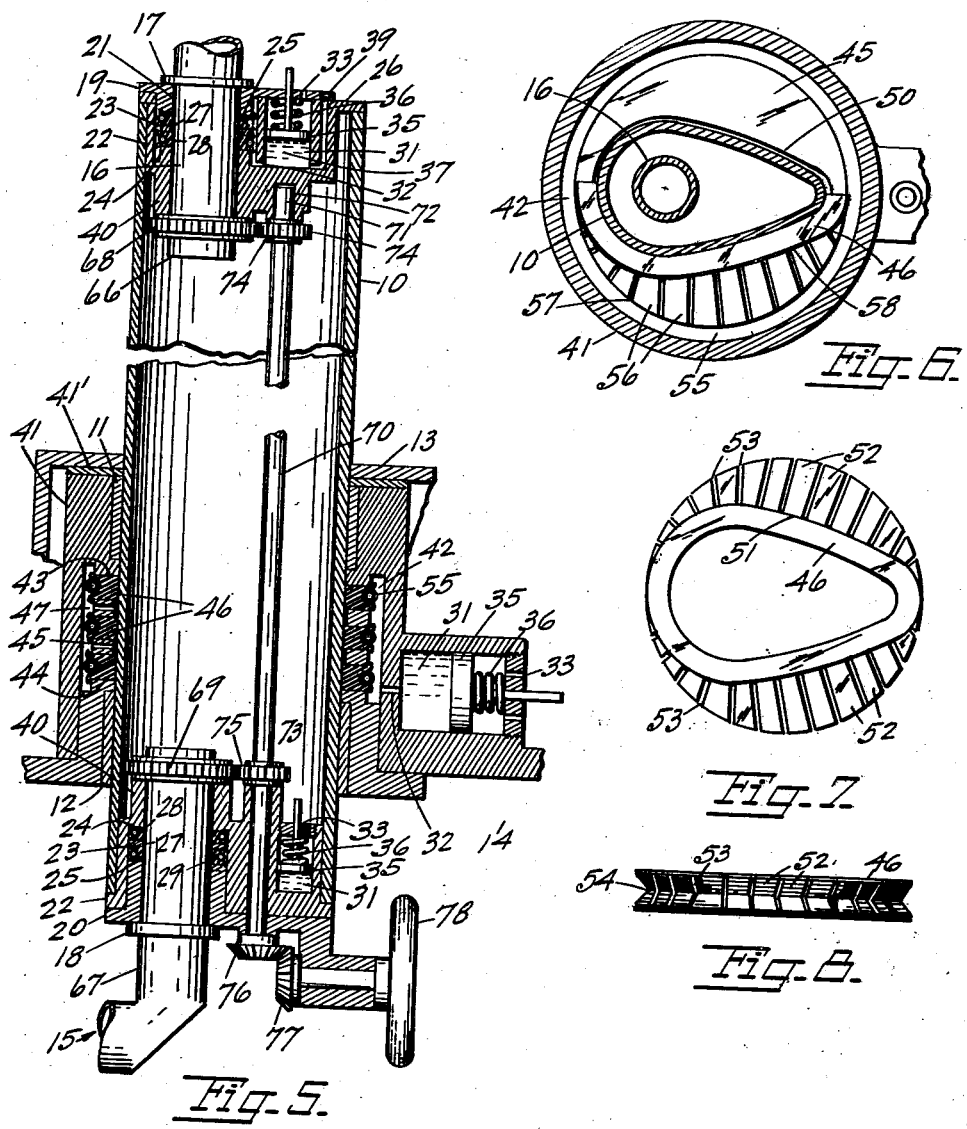

Patented Sept. 19, 1939

2,173,192

UNITED STATES PATENT OFFICE 2,173,192

PERISCOPE

John C. Williams, Oakland, Calif., assignor to John C. Williams Corporation, a corporation of Nevada Application November 10, 1937, Serial No. 173,839

8 Claims. (Cl. 88—69)

This invention, a periscope and sealing means therefor, is designed to overcome the vibration which is an inherent characteristic of conventional periscopes, and which makes them practically useless when a submarine is traveling at fair speed while under conditions of submergence; this vibration being due to the wash of waves and break of the water, which creates vacuum of constantly differing intensity in the wake of the periscope, the reactions increasing with increase in diameter and the diameter being limited to predetermined values.

Periscope tubes have been tapered toward the top to reduce this vibration, and in some cases the tubes have been streamlined throughout a portion of their length which does not have to be drawn through the submergence seal. However, streamlining is ineffective unless the streamline axis cuts the water in a plane coincident with the longitudinal axis of the submarine. If the streamline tube is turned at right angles to the direction of travel, the effect of streamlining is completely nullified, and vibration is actually increased over that of a cylindrical tube.

The following are the principal objects and advantages of the invention;

First, providing a periscope with a tube or housing which is of streamline cross-section and in which the periscope optical system may be directed in any direction at will while maintaining the major axis of the periscope tube or housing directed in the plane of travel of the submarine or other submersible device on which the periscope is mounted.

Second, providing a packing for a streamline or other non-circular housing or shaft which effectively seals the non-circular shape against ingress of water of submergence between the housing and its support, and which packing efficiently compensates for any flexure or vibration which may occur.

Third, providing means which is automatically actuated through the medium of water of submergence, and which acts to increase the intensity of sealing as the depth of submergence increases.

Other objects and advantages of the invention will become apparent as the following description is read on the drawings forming a part of this specification, and in which similar reference characters are used to designate similar parts throughout the several views, of which:

Fig. 1 is a side elevation of the invention with the packing means shown in section.

Fig. 2 is an enlarged sectional view taken on line 2—2 of Fig. 1.

Fig. 3 is a sectional elevation through the periscope tube packing or seal, taken on a line 3—3 of Fig. 2.

Fig. 4 is a fragmentary section taken on line 4—4 of Fig. 3.

Fig. 5 is a sectional side elevation through a modified form of the invention.

Fig. 6 is a section taken on line 6—6 of Fig. 1, with one half of the resilient ring broken away to show the rigid ring beneath.

Fig. 7 is a plan view of one of the resilient rings.

Fig. 8 is a side elevation of Fig. 7.

Fig. 9 is an enlarged section showing a modified form of rigid ring.

The invention includes a periscope housing 10 of non-circular cross-section, preferably streamline in form, to reduce the resistance to travel through water and increase the internal resistance to flexure or vibration. This housing is slidably mounted in suitable bearings, as 11 and 12, and supported in a suitable support, such as a conventional shear housing 13 which projects upwardly from the deck 14 of a submarine or other submersible device.

A periscope 15 has its optical axis extending upwardly through the periscope housing 10, and packing means is provided for the periscope tube 16 against ingress of water of submergence to the periscope housing 10, and packing means is also provided for the periscope housing 10 against ingress of water of submergence to the shear housing 13 and thence to the interior of the submarine or other submersible device. Additional means is provided for increasing the resistance of the packing against ingress of water as the depth of submergence is increased.

The periscope housing 10 is shown uniform in cross-section throughout its height, though it can be made tapered throughout such portions as are not required to be drawn into or through the packing in the shear housing.

In the preferred form of the invention, the periscope tube 16 extends through the housing 10 and is provided with suitable retaining means, such as thrust collars 17 and 18 respectively cooperating with the upper and lower housing-heads 19 and 20 which seal the respective ends of the housing 10. These heads are provided with suitable bearings, as 21, permitting rotary adjustment of the periscope relative to the housing 10.

Packing is provided for the upper end of the tube 10 as shown in Fig. 1, or for both ends of the tube as shown in Fig. 5, as may be desired, and this packing per se, is described and claimed in copending application Serial No. 173,837, filed November 10, 1937, for Bearing seals, and consists of a housing 22 having an annular chamber 23 formed therein coaxially to the tube, with annular thrust seal faces 24 and 25 formed respectively on the inside bottom wall of the chamber and inside face of the housing cover 19, the seal housing being indicated as having a flange 26 secured to the top end of the tube housing 10 and cover 19 secured thereover.

Interposed between the thrust faces 24 and 25 is a series of alternate rigid rings 27 and resilient rings 28, the resilient rings having each an encompassing spiral spring 29 under tension disposed in a circumferential groove formed in the ring and acting to compress the ring on the tube, and bleeder passages 30 are formed radially in the intermediate rigid rings to admit lubricant to the outside of the tube 10.

A cylinder 31 is formed in the same housing 22 and communicates at its lower end through a passage 32 with the annular chamber 23, and at its upper end through passages 33 with water of submergence 34.

A piston 35 is urged by a spring 36 to create a predetermined pressure on lubricant 37, the fluid of submergence 34 acting on the piston to increase the pressure on the lubricant as the depth of submergence is increased and thus increase the resistance of the packing against ingress of water along the tube to the inside of the periscope housing 10.

A filler passage 38 communicates with the bottom of the cylinder for refilling the cylinder with lubricant as required, and this passage is sealed by means, such as a pipe plug 39. A depending bearing 40 is shown formed integrally with the seal housing to increase the bearing area for the tube 16, although roller or ball bearings may be substituted for the sleeve bearings shown, if desired.

The packing or sealing means for the noncircular periscope housing 10 is identical in principle to the foregoing, but requires modification to adapt it to the specific shape of the non-circular housing, and consists of a seal housing 41 which is sealed within the support, such as a shear housing on a submarine as indicated at 41', or directly on the deck of the submarine or other submersible device. The shear housing or support may be of any desired shape.

The seal housing 41 is provided with suitable bearings 11 and 12, and which may be sleeve type bearings having an internal passage slidably fitting the shape of the periscope tube housing 10, or may consist of any other suitable type of bearings such as radial thrust rollers (not shown).

A cylindrical chamber 42 is formed in the seal housing 41 and provided with opposed thrust seal face terminals 43 and 44, and a series of alternate rigid encompassing members 45, such as metal, and resilient rings 46, such as rubber or rubber substitute fill the space between the opposed thrust faces under predetermined value of compression, the terminal rings of the series being of the resilient type, and the rigid rings each having a radial passage 47 for admission of grease to the inside of the rigid rings.

The rigid rings either slightly clear the shaft or periscope housing throughout their axial length, or are internally formed as shown in Fig. 9, in which the major portion of the axial length of the ring clears the housing to permit the rubber or other resilient rings to bulge about the corners of the rigid rings as indicated at 48, the internal annular collar 49 cooperating with the surface of the housing to centralize the rings relative to the housing 10.

These rigid rings conform internally to the form of the housing 10, or shaft to be sealed, and are externally circular as shown in Fig. 6, the clearance being indicated on an exaggerated scale at 50.

The resilient rings are either molded in one piece including ring and compressor elements as shown in Figs. 7 and 8, or in a compressor unit separate from the ring as shown in Fig. 6.

Referring to Figs. 7 and 8, the sealing portion of the ring is included within the confines of the line 51 and has greater axial thickness than the compressor section, which consists of a series of radial sections 52 formed by radial slots 53 extending inwardly to the line 51, and a circumferential groove 54 is formed in the periphery of these sections as shown in Fig. 8, and an encompassing spiral spring 55 creates uniform compression through all of the sections, and which is transmitted to the sealing ring proper 46, causing the inner periphery of this ring to have continuous contact under uniform predetermined pressure about the periphery of the streamline or other non-circular form of shaft or housing 10.

As indicated in Fig. 6, the active portion of the ring, indicated at 46, may be molded separately, and a compressor or radial pressure-transmitting element may be formed to fit the periphery of the ring with its outer periphery circular in normal form and formed of a multiplicity of radial sections 56 with intervening slots 57 between the sections and with the internal peripheries of all of the sections connected together as by a flexible belt or tape 58, and this last arrangement has advantages over that shown in Figs. 7 and 8, the sealing ring being thereby more elastic and consequently free and active.

A pressure booster similar to that previously described for the periscope tube seal boosts the pressure on grease in the seal chamber as the depth of submergence is increased and decreases the pressure with decrease in submergence.

The periscope housing 10 can only be raised and lowered and has its major axis (coincident with section line 3—3 of Fig. 2) directed in line with the longitudinal axis of the submarine, and therefore provides an unusually rigid construction substantially obviating vibration, while the periscope tube 16 is rotatable only, in the housing 10 to permit complete scanning of the sea by rotative adjustment thereof.

The rotative adjusting means is shown in simplest form as consisting of a lever 59 fixed on the periscope tube, and the raising and lowering means for the periscope housing is shown in simplest form as consisting of pulleys 60 and 61 and belt 62 operable by means of a crank 63 and counterweighted by means of a weight 64 attached to the belt, with the belt attached at 65 to the lower end of the periscope housing 10.

In the modified form, the periscope tube consists of upper and lower sections with the intervening portion omitted, and consists of an upper stub tube 66 and lower stub tube 67 mounted in bearings and seals at the respective ends of the periscope housing, as previously described for the tube 16.

Means for maintaining the respective upper and lower sections of the periscope in optical registry consists of gears 68 and 69 respectively mounted on the lower end of tube 66 and upper end of tube 67, these gears coincidently functioning as thrust collars for the tubes.

A vertical shaft 70 has its upper end 71 rotatable in a bearing 72 formed integrally with the seal housing 22, and the lower end of the shaft passes through a bearing 73 fixed in the housing 10 or integral with the lower seal housing 22, and the respective pinions 74 and 75 cooperate with the respective gears 68 and 69 and are fixed on the shaft 70.

A bevel gear 76 is mounted on the projecting lower end of shaft 70 and meshes with a mating gear 77 which is operable by means of a handwheel 78.

Thus, by rotating the handwheel 78, the periscope may be adjusted with its focal axis directed at any angle relative to the path of travel of the submarine, and by operating the crank 63, the entire periscope unit may be raised and lowered at will.

It will be understood that variations in construction and arrangement of parts, which variations are consistent with the appended claims, may be resorted to without detracting from the spirit or scope of the invention, or sacrificing any of the advantages thereof.

I claim:

1. In a periscope, a support, bearings having bearing passages streamline in cross-section, a housing of streamline cross-section slidably mounted in said bearings for raising and lowering adjustments only, sealing means externally cylindrical in cross-section and internally streamline in cross-section and interiorly cooperating with said housing and thrustably cooperating with said support, a cylindrical periscope supported in bearings respectively at the upper and lower ends of said housing and projecting from the opposite ends thereof and mounted for rotary adjustments only, and sealing means externally and internally cylindrical in cross-section for said upper and lower ends cooperating between said periscope and said housing, and contracting means subjecting each of said sealing means to an initial resilient pressure, said sealing means being additionally subjected to the pressure of a grease under predetermined pressure sealing against ingress of water of submergence and means associated with each of said sealing means increasing the pressure on the associated grease and coincidently said sealing means as the external fluid pressure is increased.

2. In a periscope, a support, bearings, a housing of streamline cross-section slidably mounted in said bearings for raising and lowering adjustments, sealing means cooperating between said housing and said support, a periscope supported in bearings respectively at the upper and lower ends of said housing and projecting from the opposite ends thereof and mounted for rotary adjustments only, and sealing means for said upper and lower ends cooperating between said periscope and said housing and contracting means subjecting each of said sealing means to an initial resilient pressure, said sealing means being aditionally subjected to the pressure of a grease under predetermined pressure sealing against ingress of water of submergence, and means associated with each of said sealing means increasing the pressure on the associated grease and coincidently said sealing means as the external fluid pressure is increased; said sealing means sealing said housing comprising a chamber formed in said support and having opposed thrust seal faces; alternate resilient and rigid rings filling the space between said thrust seal faces under predetermined compression, the interior peripheries of said rings conforming to the cross-sectional form of said housing and the exterior peripheries being circular in form, with the rigid rings clearing said housing and the resilient rings cooperating throughout their inner area with said housing, and bulging into the clearance space within the rigid rings, said contracting means cooperating throughout the circumference of each resilient ring and uniformly compressibly urging the inner surface of each ring of the resilient type into continuous contact throughout its inner area with the housing, under predetermined pressure.

3. In a submarine having a shear housing, a periscope comprising a periscope housing of streamline cross-section insuring minimum resistance to passage through water of submergence and maintained with its axis of least resistance in line with the longitudinal axis of the submarine and slidably mounted through passages streamline in cross-section formed through said shear housing; means for raising and lowering said housing for vertical projection and retraction relative to the shear housing, at will; resilient, peripherally conforming sealing members having passages streamline in cross-section slidably cooperating with the exterior periphery of said periscope housing for sealing said submarine against ingress of water of submergence past said housing; combined radial and circumferential urging means for said sealing members and including encompassing resilient urging means for each sealing member and depth of submergence-actuated urging means acting on all of said members; and a periscope circular in cross-section extending vertically through said periscope housing and rotatably supported therein and maintained against vertical movement relative to said periscope housing, and resilient, encompassing sealing means for the respective upper and lower ends of said periscope housing and cooperating between said periscope and said periscope housing and including combined radial and circumferential urging means and sealing against ingress of water of submergence to said periscope housing and through said periscope housing to said submarine and including a fluid subjected to predetermined pressure acting on said sealing means, and additionally subjected respectively to the pressure of fluid exteriorly and interiorly of said housing for the respective upper and lower ends.

4. A periscope for a submarine having a shear housing comprising a seal housing within said shear housing and hermetically sealed thereto and a passage streamline in cross-section with intermediate annular chamber provided with end thrust faces formed through said seal housing; a series of alternate resilient and rigid sealing members filling the space between said end thrust faces under predetermined compression, said members having passages streamline in cross-section therethrough conforming with the streamline in cross-section passage through said seal housing, said resilient members being circular in shape; a periscope housing of streamline cross-section conforming to the form of said streamline in cross-section passage and slidably supported therethrough; and encompassing resilient gathering means for each of said resilient members creating combined circumferential and radial compression uniformly distributed to the periphery of the passage therein to create uniform resilient pressure cooperation of the resilient members with said housing throughout the circumference thereof; fluid means increasing said pressure cooperation to a predetermined degree, sealing said submarine effectively under all conditions of submergence against ingress of water about said periscope housing, said fluid means having communication with the water of submergence to increase the pressure on said resilient members as the depth of submergence is increased.

5. A submarine periscope comprising, a shear housing having a bearing of streamline internal cross-section formed at each end with interposed first seal chamber provided with opposed thrust seal faces; a periscope housing of streamline cross-section slidable in said bearings and conforming in cross-sectional shape thereto; a cylindrical periscope tube extending through said periscope housing and mounted in cylindrical bearings at opposite ends of the periscope housing, and a second seal chamber formed in each bearing intermediate the length thereof and provided with opposed thrust seal faces; a cylinder in communication with each seal chamber and a piston for each cylinder and a spring urging each piston; a series of externally-cylindrical in cross-section alternate resilient and rigid rings compressibly retained between the opposed thrust seal faces of each chamber and having bearing passages streamline in cross-section for the said first seal chambers, and circular in cross-section for the said second seal chambers; contracting means circumferentially cooperating with each resilient ring urging the ring into continuous contact with the member being sealed thereby; a supply of grease filling each cylinder and its associated chamber; said pistons for the shear housing and for the upper end of the periscope housing being subjected to the pressure of external fluids, and for the lower end of the periscope housing to the pressure of the fluid therein, and varying the pressure on the grease in conformity with variations in pressures of the fluids.

6. A submarine periscope comprising, a shear housing having a bearing of streamline internal cross-section formed at each end with interposed seal chamber provided with opposed thrust seal faces; a periscope housing slidable in said bearings and conforming in cross-sectional shape thereto; a cylindrical periscope tube extending through said periscope housing and mounted in bearings at opposite ends of the periscope housing, and a seal chamber formed in each bearing intermediate the length thereof and provided with opposed thrust seal faces; a cylinder in communication with each chamber and a piston for each cylinder and a spring urging each piston; a series of alternate resilient and rigid rings compressibly retained between the opposed thrust seal faces of each chamber; contracting means circumferentially cooperating with each resilient ring urging the ring into continuous contact with the member being sealed thereby; a supply of grease filling each cylinder and its associated chamber; said pistons for the shear housing and for the upper end of the periscope housing being subjected to the pressure of external fluids, and for the lower end of the periscope housing to the pressure of the fluid therein, and varying the pressure on the grease in conformity with variations in pressures of the fluids; the resilient rings in said seal chamber for said shear housing having their exterior periphery of circular shape and being radially slotted with respective slots terminating equidistantly from the inner surface of the ring, whereby uniform radial urgence is provided to the inner periphery of the ring by the contracting means.

7. A submarine periscope comprising, a shear housing having a bearing of streamline internal cross-section formed at each end with interposed seal chamber provided with opposed thrust seal faces; a periscope housing slidable in said bearings and conforming in cross-sectional shape thereto; a cylindrical periscope tube extending through said periscope housing and mounted in bearings at opposite ends of the periscope housing, and a seal chamber formed in each bearing intermediate the length thereof and provided with opposed thrust seal faces; a cylinder in communication with each chamber and a piston for each cylinder and a spring urging each piston; a series of alternate resilient and rigid rings compressibly retained between the opposed thrust seal faces of each chamber; contracting means circumferentially cooperating with each resilient ring urging the ring into continuous contact with the member being sealed thereby; a supply of grease filling each cylinder and its associated chamber; said pistons for the shear housing and for the upper end of the periscope housing being subjected to the pressure of external fluids, and for the lower end of the periscope housing to the pressure of the fluid therein, and varying the pressure on the grease in conformity with variations in pressures of the fluids; in which the rigid rings clear the member sealed thereby and the inner portions of the resilient rings expand axially about the inner edges of the rigid rings; the resilient rings in said seal chamber for said shear housing having their exterior peripheries of circular shape and being radially slotted with the respective slots terminating equidistantly from the inner surface of the ring, whereby uniform radial urgence is provided to the inner periphery of the rings by the contracting means.

8. A submarine periscope comprising, a shear housing having a bearing of streamline internal cross-section formed at each end with interposed seal chamber provided with opposed thrust seal faces; a periscope housing slidable in said bearings and conforming in cross-sectional shape thereto; a cylindrical periscope tube extending through said periscope housing and mounted in bearings at opposite ends of the periscope housing, and a seal chamber formed in each bearing intermediate the length thereof and provided with opposed thrust seal faces; a cylinder in communication with each chamber and a piston for each cylinder and a spring urging each piston; a series of alternate resilient and rigid rings compressibly retained between the opposed thrust seal faces of each chamber; contracting means circumferentially cooperating with each resilient ring urging the ring into continuous contact with the member being sealed thereby; a supply of grease filling each cylinder and its associated chamber; said pistons for the shear housing and for the upper end of the periscope housing being subjected to the pressure of external fluids, and for the lower end of the periscope housing to the pressure of the fluid therein, and varying the pressure on the grease in conformity with variations in pressures of the fluids; in which the rigid rings clear the member sealed thereby and the inner portions of the resilient rings expand axially about the inner edges of the rigid rings; said rigid rings having an internal annular spacer for centralizing the rings to provide uniform bulging or expansion of the resilient rings about the inner edges of the rigid rings; the resilient rings in said seal chamber for said shear housing having their exterior peripheries of circular shape and being radially slotted with the respective slots terminating equidistantly from the inner surface of the ring, whereby uniform radial urgence is provided to the inner peripheries of the resilient rings by the contracting means.

JOHN C. WILLIAMS.